US011893725B2

(12) United States Patent
Wang et al.

(10) Patent No.: US 11,893,725 B2
(45) Date of Patent: Feb. 6, 2024

(54) METHOD FOR EVALUATING AND SYSTEM FOR DETECTING AND EVALUATING GEOMETRIC FORM OF HONEYCOMB PRODUCT

(71) Applicant: CENTRAL SOUTH UNIVERSITY, Hunan (CN)

(72) Inventors: Zhonggang Wang, Hunan (CN); Can Cui, Hunan (CN); Chong Shi, Hunan (CN); Xifeng Liang, Hunan (CN); Zhendong Li, Hunan (CN); Bo Sun, Hunan (CN); Ziping Lei, Hunan (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 0 days.

(21) Appl. No.: 17/422,721

(22) PCT Filed: Aug. 18, 2020

(86) PCT No.: PCT/CN2020/109731
§ 371 (c)(1),
(2) Date: Jul. 13, 2021

(87) PCT Pub. No.: WO2021/227288
PCT Pub. Date: Nov. 18, 2021

(65) Prior Publication Data
US 2023/0214986 A1 Jul. 6, 2023

(30) Foreign Application Priority Data
May 9, 2020 (CN) .......................... 202010387864.9
May 9, 2020 (CN) .......................... 202010388343.5

(51) Int. Cl.
H04N 23/695 (2023.01)
G06T 7/00 (2017.01)
H04N 23/90 (2023.01)

(52) U.S. Cl.
CPC ......... *G06T 7/0006* (2013.01); *H04N 23/695* (2023.01); *H04N 23/90* (2023.01);
(Continued)

(58) Field of Classification Search
None
See application file for complete search history.

(56) References Cited

U.S. PATENT DOCUMENTS

2002/0090115 A1* 7/2002 Abe .......................... G06T 7/70
382/199
2009/0246458 A1* 10/2009 Yamada ............... B01D 46/249
428/116
2017/0365050 A1* 12/2017 Kurahashi ............. G06T 7/0004

* cited by examiner

*Primary Examiner* — Eileen M Adams
(74) *Attorney, Agent, or Firm* — Dragon Sun Law Firm, PC; Nathaniel Perkins

(57) ABSTRACT

Disclosed are a method for evaluating a geometric form of a honeycomb product and a system for detecting and evaluating a geometric form of a honeycomb product. The method for evaluating the geometric form includes: acquiring a top-surface image and a side-surface image of the honeycomb product; acquiring vertex coordinates by extracting vertices from the top-surface image; acquiring serial numbers of six vertices of each cell by reconstructing the cells of the top-surface image; computing deviation angles of six interior angles of each cell based on the serial numbers and vertex coordinates of the six vertices of each cell; extracting a top-surface side boundary and a side-surface side boundary of the honeycomb product from the top-surface image and the side-surface image; computing a maximum top-surface deflection and a maximum side-surface deflection of the honeycomb product based on the top-surface side boundary and the side-surface side boundary.

16 Claims, 3 Drawing Sheets

(52) U.S. Cl.
CPC ............... *G06T 2207/20021* (2013.01); *G06T 2207/30108* (2013.01)

METHOD FOR EVALUATING AND SYSTEM FOR DETECTING AND EVALUATING GEOMETRIC FORM OF HONEYCOMB PRODUCT

CROSS-REFERENCE TO RELATED APPLICATIONS

This Application is a national stage application of PCT/CN2020/109731. This application claims priorities from PCT Application No. PCT/CN2020/109731, filed Aug. 18, 2020, and from the Chinese patent application 202010388343.5 filed May 9, 2020, and from the Chinese patent application 202010387864.9, filed May 9, 2020, the content of which are incorporated herein in the entirety by reference.

TECHNICAL FIELD

The present invention relates to the field of the design, manufacture and application of lightweight structural products for transportation, machinery, aerospace, ships and other equipment, and in particular, relates to a method for evaluating a geometric form of a honeycomb product and a system for detecting and evaluating a geometric form of a honeycomb product.

BACKGROUND

Lightweight honeycomb structures have been widely used in various engineering fields due to their excellent load-bearing and energy-absorbing properties. However, various structural defects such as the bend, warpage, and cell irregularity of a honeycomb core block inevitably occur during the manufacturing of these products, and have been proved to seriously affect their load-bearing and energy-absorbing properties. Moreover, since honeycomb products are in periodic porous structures with typical features such as multiple vertices, thin walls, and wide bearing surfaces, the characteristic information of their structural defects can hardly be obtained through a traditional ultrasonic inspection technology. Therefore, there is an urgent need to carry out the work on the detection and evaluation of regularity of honeycomb products to avoid the risk in using inferior products.

SUMMARY

I. Object of the Invention

An object of the present invention is to provide a method for evaluating a geometric form and a system for detecting and evaluating a geometric form for a honeycomb product, for accurately evaluating the geometric form of the honeycomb product.

II. Technical Solution

To solve the above-mentioned problems, a first aspect of the present invention provides a method for evaluating a geometric form of a honeycomb product. The method includes steps of: acquiring a top-surface image and a side-surface image of the honeycomb product; acquiring vertex coordinates by extracting vertices from the top-surface image; acquiring serial numbers of six vertices of each cell by reconstructing the cells of the top-surface image; computing deviation angles of six interior angles of each cell based on the serial numbers and vertex coordinates of the six vertices of each cell; extracting a top-surface side boundary and a side-surface side boundary of the honeycomb product from the top-surface image and the side-surface image; computing a maximum top-surface deflection and a maximum side-surface deflection of the honeycomb product based on the top-surface side boundary and the side-surface side boundary; judging whether the honeycomb product is qualified based on the deviation angles, the maximum top-surface deflection and the maximum side-surface deflection.

Optionally, the step of judging whether the honeycomb product is qualified based on the deviation angles, the maximum top-surface deflection and the maximum side-surface deflection includes a step of: judging the honeycomb product as qualified if geometric regularity of the honeycomb product judged based on the deviation angles, the maximum top-surface deflection and the maximum side-surface deflection reaches a preset standard.

Optionally, the geometric regularity includes: top-surface cell regularity, side-surface flatness, and top-surface flatness, and the step of judging the honeycomb product as qualified if the geometric regularity of the honeycomb product judged based on the deviation angles, the maximum top-surface deflection and the maximum side-surface deflection reaches the preset standard, includes steps of: judging the top-surface cell regularity based on the deviation angles, judging the side-surface flatness based on the maximum top-surface deflection, judging the top-surface flatness based on the maximum side-surface deflection, and judging the honeycomb product as qualified if the top-surface cell regularity, the side-surface flatness and the top-surface flatness all reach preset standards.

Optionally, judgment indexes for the top-surface cell regularity include one or more of a maximum deviation angle, an average deviation angle, a maximum value among average cell deviation angles, a standard deviation of deviation angle and a standard deviation of average cell deviation angle; it is judged that the top-surface cell regularity reaches the preset standard if one or more of the maximum deviation angle, the average deviation angle, the maximum value among average cell deviation angles, the standard deviation of deviation angle and the standard deviation of average cell deviation angle is/are less than a preset threshold(s).

Optionally, judgment indexes for the top-surface cell regularity include one or more of a maximum deviation angle, an average deviation angle, a maximum value among average cell deviation angles, a standard deviation of deviation angle and a standard deviation of average cell deviation angle; it is judged that the top-surface cell regularity reaches the preset standard if a proportion(s), higher than a preset threshold(s), of one or more of the maximum deviation angle, the average deviation angle, the maximum value among average cell deviation angles, the standard deviation of deviation angle and the standard deviation of average cell deviation angle is/are less than a preset proportion(s).

Optionally, judgment indexes for the top-surface cell regularity include an average cell deviation angle; it is judged that the top-surface cell regularity reaches the preset standard if the average cell deviation angle is successively not greater than percentages of cells A1, A2, A3, A4, and A5 in terms of overall cells, and is successively less than corresponding thresholds B1, B2, B3, B4, and B5.

Optionally, a method for extracting the vertices includes steps of: acquiring a skeleton diagram of the honeycomb product; acquiring a sequence of boundary pixels of a cell by extracting boundary pixels belonging to the same cell from the skeleton image; acquiring a sequence of included angles corresponding to the boundary pixels by acquiring the included angles corresponding to the boundary pixels respectively, wherein each of the included angles is an included angle between connecting lines of one of the boundary pixels with two pixels, in the sequence of the boundary pixels, that are separated from the one of the boundary pixels by a first preset number of pixels respectively, at both sides of the one of the boundary pixels; performing non-minimum suppression on the sequence of included angles by using a window having a size of a second preset value, wherein included angles other than an included angle with a minimum value in the window are set as first preset included angles; determining, when the non-minimum suppression on the sequence of included angles is completed, the boundary pixels corresponding to included angles smaller than a second preset included angle among all the minimum values, as the vertices.

Optionally, a method for extracting the vertices includes steps of: acquiring a skeleton diagram of a vertex image; searching eight neighborhoods of each pixel on the skeleton diagram for a round according to a preset sequence, wherein a pixel is determined as a vertex if this pixel's value has changed six times.

Optionally, a method for extracting the vertices includes: S1: acquiring a square window with a preset side length L, and setting a square window with a side length increasing successively from 3 pixels, wherein after the square window traverses a vertex image, a minimum value of a number of pixels having pixel values of 0 in the square window is non-zero for the first time; S2: traversing each pixel having a pixel value of 1 in the vertex image with the square window, and then assigning a sum of counts of pixels having the pixel values of 1 in each square window to a pixel at a center point of the square window; S3: establishing a square area with an initial side length E=L with the maximum assigned pixel as a center, computing an absolute value of a difference between an assigned value of each pixel on the four boundaries of the square area and the assigned value of the center point of the square area, and recording a minimum absolute value Z of the difference and coordinates of a boundary pixel corresponding thereto; S4: establishing a new square area with E=E+2 pixels, repeating S3 until the minimum absolute value of the difference has an obvious trend of increasing reversely to acquire at this time coordinates of a boundary pixel with the minimum absolute value Z of the difference and coordinates of a corresponding center point of the square area, and acquiring a side length A of a honeycomb cell by solving values of the coordinates of the boundary pixel with the value Z and solving values of the coordinates of the corresponding center point of the square area; S5: determining a pixel having a maximum assigned value as a vertex, establishing a square annihilation window, with a side length A of the honeycomb cell as a side length, by taking the vertex as a center, zero-clearing the assigned values on all pixels having pixel values of 1 in the annihilation window, based on which a pixel with a maximum assigned value among the remaining assigned values is found, determined as a vertex and recorded, and repeating the procedures of the annihilation window until the assigned value on each pixel having the pixel value of 1 is less than a given threshold, and extracting all the vertices.

Optionally, a method for reconstructing cells includes steps of: tracking a boundary of each cell by using a Moore neighborhood tracking algorithm; establishing a window having a preset size with each tracked boundary point as a center, recording, if a vertex is present in the window, a number of the vertex and storing the number under the name of the cell, ranking encountered vertices of the cell based on a sequential order of the encountered vertices, and after the tracking, connecting the vertices of the respective cells into lines in sequence to acquire a cell reconstruction graph.

A second aspect of the present invention provides a system for detecting and evaluating a geometric form of a honeycomb product, for implementing the method for evaluating the geometric form of the honeycomb product as defined above. The system includes: a placement stage configured to support a honeycomb product; cameras disposed above a top of and on a side of the honeycomb product and configured to acquire an original top-surface image and an original side-surface image of the honeycomb product by shooting the honeycomb product; a camera moving device configured to move the cameras above the top of and at the side of the honeycomb product so that the cameras acquire a complete original top-surface image and a complete original side-surface image; an analyzing and evaluating module configured to: acquire a top-surface image and a side-surface image by acquiring and performing noise-reduction filtering, binarization and morphological filtering on the complete original top-surface image and the complete original side-surface image; acquire vertex coordinates by extracting vertices from the top-surface image; acquire serial numbers of six vertices of each cell by reconstructing the cells of the top-surface image; compute deviation angles of six interior angles of each cell based on the serial numbers and vertex coordinates of the six vertices of each cell; extract a top-surface side boundary and a side-surface side boundary of the honeycomb product from the preprocessed top-surface and side-surface images; compute a maximum top-surface deflection and a maximum side-surface deflection of the honeycomb product based on the top-surface side boundary and the side-surface side boundary; judge whether the honeycomb product is qualified based on the deviation angles, the maximum top-surface deflection and the maximum side-surface deflection.

Optionally, the camera moving device includes: a walking gantry, to which the cameras are connected; sliding rails disposed along a length direction of the honeycomb product, wherein the walking gantry is disposed on and moves along the sliding rails.

III. Beneficial Effects

The above-mentioned technical solutions of the present invention have the following beneficial technical effects:

the method for evaluating the geometric form according to the present invention accurately judges whether the geometric form of the honeycomb product is qualified by simply processing the images in a contactless fashion, without damaging the honeycomb product.

REFERENCE SIGNS

Figure 1:
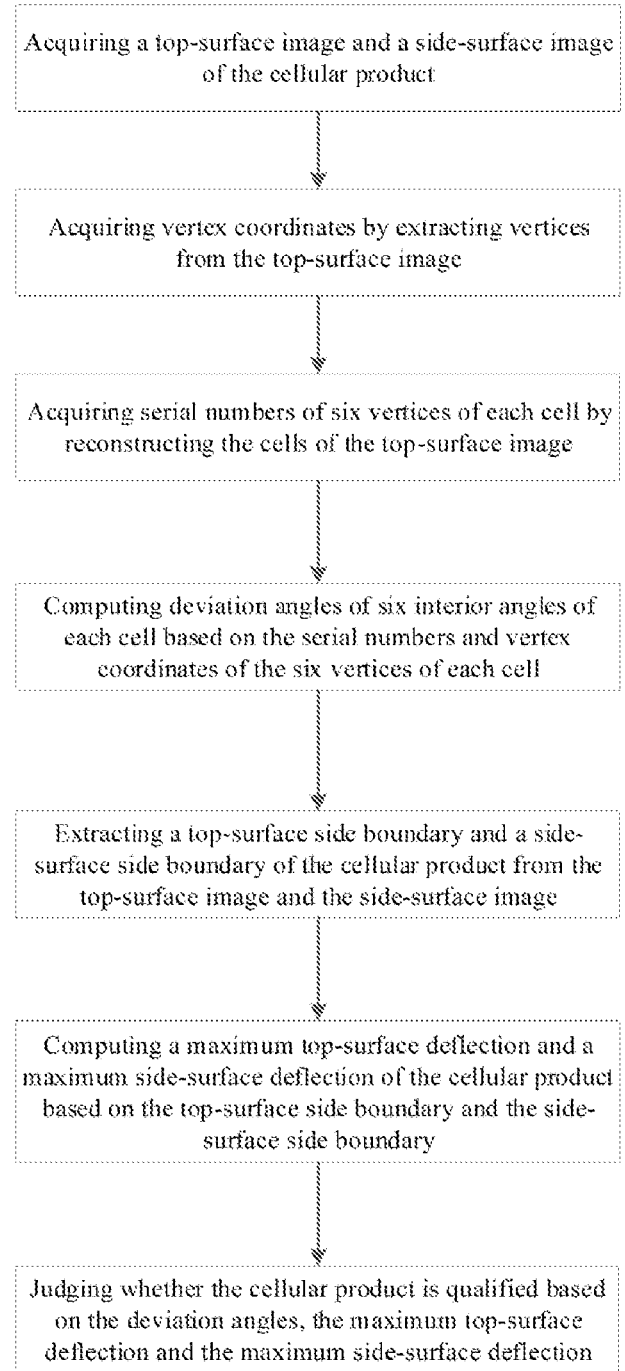
FIG. 1 is a flowchart of a method for evaluating a geometric form of a honeycomb product according to the present invention.

1: placement stage; 2: honeycomb product; 3: camera; 4: camera moving device; 41: walking gantry; 42: sliding rails; 43: roller; 44: moving block; 5: analyzing and evaluating module; 6: clamp; 7: lifting device.

DETAILED DESCRIPTION

For clearer descriptions of the objectives, technical solutions, and advantages of the present invention, the present invention will be further described in detail hereinafter in combination with specific embodiments and with reference to the accompanying drawings. It should be understood that these descriptions are merely illustrative and are not intended to limit the scope of the present invention. In addition, the descriptions of well-known structures and techniques are omitted in the illustration below, in order to avoid unnecessarily obscuring the concept of the present invention.

The accompanying drawings show schematic diagrams of a layer structure according to embodiments of the present invention. The drawings are not drawn to scale, in which some details are exaggerated for clarity purposes, and some details may be omitted. The shapes of various areas and layers shown in the drawings as well as the relative size and positional relationship therebetween are only exemplary, and may vary in practice due to manufacturing tolerances or technical limitations, and a person skilled in the art may additionally design areas/layers with different shapes, sizes, and relative positions according to actual needs.

Obviously, the described embodiments are only part of rather than all of the embodiments of the present disclosure. Based on the embodiments of the present invention, every other embodiment obtained by a person of ordinary skills in the art without making inventive efforts shall fall within the protection scope of the present invention.

In the description of the present invention, it should be noted that terms "first", "second" and "third" are for descriptive purposes only and are not to be construed as indicating or implying relative importance.

In addition, the technical features involved in different embodiments of the present invention described below can be combined with each other as long as they do not conflict with each other.

Figure 2:
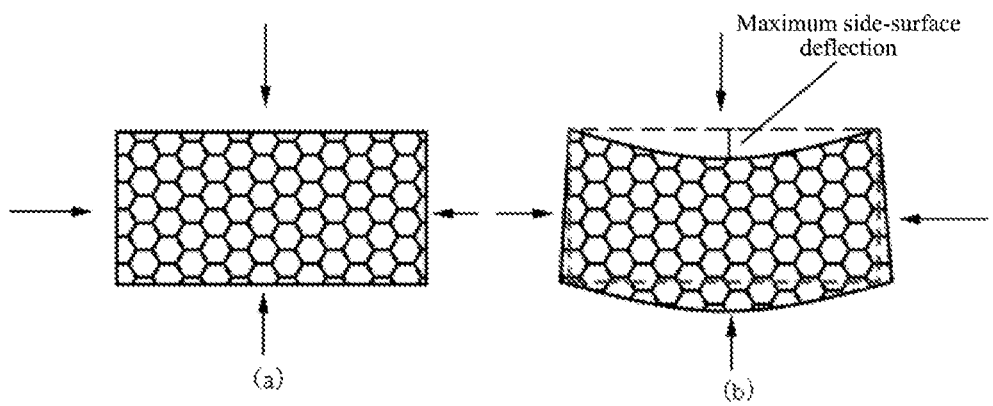
FIG. 2 is a top view of the honeycomb product according to the present invention.
Figure 3:
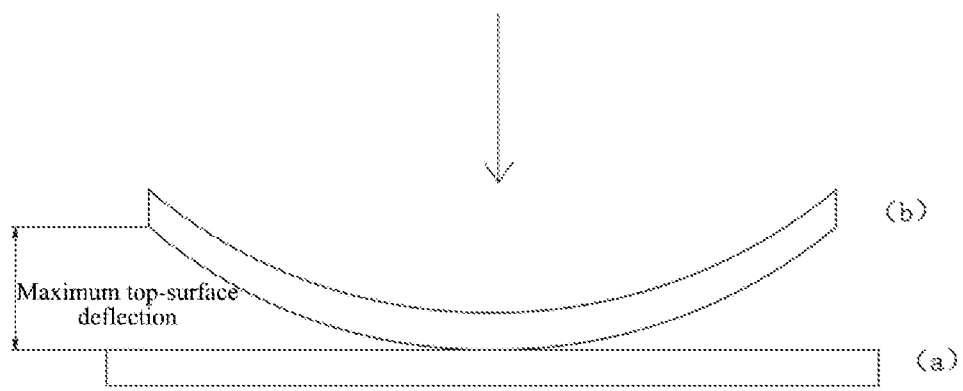
FIG. 3 is a side profile view of the honeycomb product according to the present invention.

FIG. 2 is a top view of a honeycomb product according to the present invention, and FIG. 3 is a side profile view of the honeycomb product according to the present invention.

Before describing embodiments of the present invention, the terminology of directions in the present invention will be explained at first. Referring to FIG. 2, (a) is a top view of a standard honeycomb product, and (b) is a top view of a honeycomb product to be evaluated. An original side-surface image of a honeycomb product of the present application, i.e., FIG. 3, can be acquired when viewed from the direction of the arrow. Referring to FIG. 3, (a) is a side profile view of the standard honeycomb product, and (b) is a side profile view of the honeycomb product to be evaluated. An original top-surface image of the honeycomb product of the present application can be acquired when viewed from the direction of the arrow.

Embodiment 1

FIG. 1 is a flowchart of a method for evaluating a geometric form of a honeycomb product according to Embodiment 1 of the present application.

As shown in FIG. 1, this embodiment provides the method for evaluating the geometric form of the honeycomb product. The method includes steps of: acquiring a top-surface image and a side-surface image of the honeycomb product; acquiring vertex coordinates by extracting vertices from the top-surface image; acquiring serial numbers of six vertices of each cell by reconstructing the cells of the top-surface image; computing deviation angles of six interior angles of each cell based on the serial numbers and vertex coordinates of the six vertices of each cell; extracting a top-surface side boundary and a side-surface side boundary of the honeycomb product from the preprocessed top-surface and side-surface images; computing a maximum top-surface deflection and a maximum side-surface deflection of the honeycomb product based on the top-surface side boundary and the side-surface side boundary; judging whether the honeycomb product is qualified based on the deviation angles, the maximum top-surface deflection and the maximum side-surface deflection. Referring to FIG. 2, (b) is a top view of a honeycomb product to be evaluated, where a dotted line indicates a top profile view of a standard honeycomb product, and a maximum side-surface deflection can be seen from FIG. 2. Referring to FIG. 3, (b) is a top view of the honeycomb product to be evaluated, where a dotted line indicates a top profile view of the standard honeycomb product, and the maximum top-surface deflection can be seen from FIG. 3.

By judging whether the geometric regularity is qualified through the acquisition of the top-surface and side-surface images of the honeycomb product, the present invention accurately judges whether the geometric form of the honeycomb product is qualified by simply processing the images in a contactless fashion. When the geometric form of the honeycomb product is qualified, the mechanical properties of the honeycomb product conform to the requirements of products such as airfoils, deck surfaces, hatch covers, floor, engine guards, exhaust nozzles, muffler plates, heat-insulating plates, satellite body shells, rigid solar cell wings, parabolic antennas, and bottoms of rocket propellant tanks.

Specifically, an absolute value of a difference between an interior angle and 120° is a deviation angle of a corresponding vertex of the cell.

In an alternative implementation of this embodiment, the step of judging whether the honeycomb product is qualified based on the deviation angles, the maximum top-surface deflection and the maximum side-surface deflection includes a step of: judging the honeycomb product as qualified if geometric regularity of the honeycomb product judged based on the deviation angles, the maximum top-surface deflection and the maximum side-surface deflection reaches a preset standard. The geometric regularity includes: top-surface cell regularity, side-surface flatness, and top-surface flatness.

In an alternative implementation of this embodiment, the step of acquiring the top-surface image and the side-surface image of the honeycomb product includes steps of: acquiring a complete original top-surface image and a complete original side-surface image, and acquiring the top-surface image and the side-surface image by preprocessing the acquired complete original top-surface image and the acquired complete original side-surface image.

Furthermore, the preprocessing includes the following steps:
- image processes required for computing the top-surface cell regularity sequentially include noise-reduction filtering, binarization, and morphological filtering, wherein a median filtering method is used in the noise-reduction filtering to reduce noises of the images; an Otsu method is used in the binarization and is executed so that pixels of a honeycomb wall are 1, and pixels of background, i.e., holes, are 0; the morphological filtering may correct errors of the binarization;
- image processes required for computing the side-surface flatness: hole filling, edge extraction, and contour-line filtering are executed additionally based on the above-mentioned step;
- image processes required for computing the top-surface flatness: the edge extraction is executed additionally based on the noise-reduction filtering, binarization, and morphological filtering; the edge extraction is to extract a contour line at an edge of the top-surface image or the side-surface image by using a canny algorithm or/and a sobel algorithm; the hole filling is to fully fill cell holes in the top-surface image with pixels having pixel values of 1 by using a morphological method for hole filling; the contour-line filtering is to make the contours line in the images smoother by filtering the contour lines with a Gaussian filtering method.

In an alternative implementation of this embodiment, the geometric regularity includes: top-surface cell regularity, side-surface flatness, and top-surface flatness, and the step of judging the honeycomb product as qualified if the geometric regularity of the honeycomb product judged based on the deviation angles, the maximum top-surface deflection and the maximum side-surface deflection reaches the preset standard, includes steps of: judging the top-surface cell regularity based on the deviation angles, judging the side-surface flatness based on the maximum top-surface deflection, judging the top-surface flatness based on the maximum side-surface deflection, and judging the honeycomb product as qualified if the top-surface cell regularity, the side-surface flatness and the top-surface flatness all reach preset standards.

In an alternative implementation of this embodiment, judgment indexes for the top-surface cell regularity include one or more of a maximum deviation angle, an average deviation angle, a maximum average cell deviation angle, a standard deviation of deviation angle and a standard deviation of average cell deviation angle. The top-surface cell regularity reaches the preset standard if one or more of the maximum deviation angle, the average deviation angle, the maximum average cell deviation angle, the standard deviation of deviation angle and the standard deviation of average cell deviation angle is/are less than a preset threshold(s). After reaching the preset standard, the mechanical properties of the honeycomb product conform to the requirements of products such as airfoils, deck surfaces, hatch covers, floor, engine guards, exhaust nozzles, muffler plates, heat-insulating plates, satellite body shells, rigid solar cell wings, parabolic antennas, and bottoms of rocket propellant tanks.

In an alternative implementation of this embodiment, judgment indexes for the top-surface cell regularity include one or more of a maximum deviation angle, an average deviation angle, a maximum average cell deviation angle, a standard deviation of deviation angle and a standard deviation of average cell deviation angle. The top-surface cell regularity reaches the preset standard if a proportion(s), higher than a preset threshold(s), of one or more of the maximum deviation angle, the average deviation angle, the maximum average cell deviation angle, the standard deviation of deviation angle and the standard deviation of average cell deviation angle is/are less than a preset proportion(s). After reaching the preset standard, the mechanical properties of the honeycomb product conform to the requirements of products such as airfoils, deck surfaces, hatch covers, floor, engine guards, exhaust nozzles, muffler plates, heat-insulating plates, satellite body shells, rigid solar cell wings, parabolic antennas, and bottoms of rocket propellant tanks.

In an alternative implementation of this embodiment, judgment indexes for the top-surface cell regularity include an average cell deviation angle. The top-surface cell regularity reaches the preset standard if the average cell deviation angle is successively not greater than percentages of cells A1, A2, A3, A4, and A5 in terms of overall cells, and is successively less than corresponding thresholds B1, B2, B3, B4, and B5. After reaching the preset standard, the mechanical properties of the honeycomb product conform to the requirements of products such as airfoils, deck surfaces, hatch covers, floor, engine guards, exhaust nozzles, muffler plates, heat-insulating plates, satellite body shells, rigid solar cell wings, parabolic antennas, and bottoms of rocket propellant tanks.

Furthermore, the maximum deviation angle is a maximum value among all the deviation angles;

the average deviation angle is an average value of all the deviation angles;

the maximum value among average cell deviation angles is acquired by first computing an average value of all the deviation angles of a single cell, i.e., an average deviation angle of the cell, and a maximum value among the average deviation angles of all the cells is the average cell deviation angle;

the standard deviation of deviation angle is computed by taking all the deviation angles as samples;

the standard deviation of average cell deviation angle is computed by taking average values of the deviation angles of all the cells as samples.

In an alternative implementation of this embodiment, the method for extracting the vertices include: a contour-line included angle method, a branch point method, a HARRIS method, and a moving window method.

The contour-line included angle method includes the following steps:
- a skeleton diagram of the honeycomb product is acquired;
- a sequence of boundary pixels of a cell is acquired by extracting boundary pixels belonging to the same cell from the skeleton image;
- a sequence of included angles corresponding to the boundary pixels is acquired by acquiring the included angles corresponding to the boundary pixels respectively, wherein each of the included angles is a included angle between connecting lines of one of the boundary pixels with two pixels, in the sequence of the boundary pixels, that are separated from the one of the boundary pixels by a first preset number of pixels respectively, at both sides of the one of the boundary pixels;
- non-minimum suppression on the sequence of included angles is performed by using a window having a size of a second preset value, wherein included angles other than an included angle with a minimum value in the window are set as first preset included angles;
- the boundary pixels corresponding to included angles smaller than a second preset included angle among all the minimum values are determined as the vertices when the non-minimum suppression on the sequence of included angles is completed.

The branch point method includes the following steps: a skeleton diagram of a vertex image is acquired; eight neighborhoods of each pixel on the skeleton diagram are searched for a round according to a preset sequence, wherein a pixel is determined as a vertex if this pixel's value has changed six times. Specifically, firstly, a skeleton diagram is drawn, based on a morphological image, from lines having pixel values of 1 by using line segments having a line width of 1 pixel; secondly, a pixel 1 to a pixel k are traversed based on the skeleton diagram with k pixels, and whenever a pixel having a pixel value equal to 1 is encountered, eight neighborhoods of the pixel are searched for a round in a clockwise or counterclockwise direction to acquire a number of changes of a pixel's value; if the number of changes of the pixel's value is 4, it is shown that two straight lines pass through the pixel, and when a reasonable included angle is known to be present between the two straight lines by computing coordinates, the pixel is determined as an edge vertex and recorded; if the number of changes of the pixel's value is 6, it is shown that three straight lines pass through the pixel, and the pixel is determined as a center vertex and recorded, and the extraction of the vertices is completed. The morphological image is acquired by preprocessing.

In the HARRIS method, firstly, a skeleton diagram is drawn, based on a morphological image, from lines having pixel values of 1 by using line segments having a line width of 1 pixel; secondly, a window with a size of 5×5 pixels is established by taking a pixel having a pixel value equal to 1 as a center point, and if part area of the window overflows the skeleton image, pixel values of pixels in the overflow area are firstly assigned as 0, and then a corner response function value R corresponding to the center point is computed by using the Harris algorithm; among all the values R in the same window, the values R of pixels 1% less than a maximum value of R are set to zero, and the whole skeleton diagram is traversed by repeating the above-mentioned procedures; next, a window with a size of 3×3 pixels is established by taking each pixel having a pixel value equal to 1 and a value R more than zero, as a center point, and if a value R of the center point is a maximum value in this window, the center point is recorded as a vertex, and the whole skeleton diagram is traversed by repeating the above-mentioned procedures, and the extraction of the vertices is completed. The morphological image is acquired by preprocessing.

The moving window method includes the following steps. In S1, a square window with a preset side length L is acquired, where after the square window traverses a vertex image, a minimum value of a number of pixels having pixel values of 0 in the square window is non-zero. Said acquiring a square window with a preset side length L includes: setting a square window having a side length capable of changing increasingly by taking a morphological image as an object, and after a window of a certain side length traverses the morphological image, defining the side length of the square window as wall thickness L if a minimum value of the number of pixels having pixel values equal to 1 in the window is non-zero.

In S2, each pixel having a pixel value of 1 in the vertex image is traversed with the square window, and then a sum of counts of pixels having the pixel values of 1 in each square window is assigned to a pixel at a center point of the square window.

In S3, a square area with an initial side length E=L is established with the maximum assigned pixel as a center; an absolute value of a difference between an assigned value of each pixel on the four boundaries of the square area and the assigned value of the center point of the square area is computed; a minimum absolute value Z of the difference and coordinates of a boundary pixel corresponding thereto are recorded.

In S4, a new square area with E=E+2 pixels is established; S3 is repeated until the minimum absolute value of the difference has an obvious trend of increasing reversely to acquire at this time coordinates of a boundary pixel with the minimum absolute value Z of the difference and coordinates of a corresponding center point of a square area, and a side length A of a honeycomb cell is acquired by solving values of the coordinates of the boundary pixel with the value Z and solving values of the coordinates of the corresponding center point of the square area, where the obvious trend of increasing reversely refers to that the minimum absolute value of the difference tends to decrease first and then increase.

In S5, a pixel having a maximum assigned value is determined as a vertex; a square annihilation window, with a side length A of the honeycomb cell as a side length, is established by taking the vertex as a center; the assigned values on all pixels having pixel values of 1 in the annihilation window are zero-cleared, based on which a pixel with a maximum assigned value among the remaining assigned values is found, determined as a vertex and recorded; the procedures of the annihilation window are repeated until the assigned value on each pixel having the pixel value of 1 is less than a given threshold, and all the vertices are extracted. The given threshold is related to the specific thickness L of a honeycomb wall and has no uniform value. the threshold is selected based on the principle of averaging a maximum assigned value in the image and an assigned value corresponding to a center pixel of the honeycomb wall.

In an alternative implementation of this embodiment, a method for reconstructing cells includes: a neighborhood window recursion method. The neighborhood window recursion method includes the following steps: a boundary of each cell is tracked by using a Moore neighborhood tracking algorithm; a window having a preset size is established with each tracked boundary point as a center, if a vertex is present in the window, a number of the vertex is recorded and is stored under the name of the cell, encountered vertices of the cell are ranked based on a sequential order of the encountered vertices, and after the tracking, the vertices of the respective cells are connected into lines in sequence to acquire a cell reconstruction graph.

Specifically, said reconstructing the cells refers to the establishment of a mapping relationship between the cells and the vertices, that is, which vertices belong to the same cell, and the vertices are connected into lines based thereon to acquire an image of a honeycomb structure again. The neighborhood window recursion method is used here, which includes the following steps: a boundary of each cell is tracked by using a Moore neighborhood tracking algorithm; a window having a preset size is established with each tracked boundary point as a center, if a vertex is present in the window, a number of the vertex is recorded and is stored under the name of the cell, encountered vertices of the cell are ranked based on a sequential order of the encountered vertices, and after the tracking, the vertices of the respective cells are connected into lines in sequence to acquire a cell reconstruction graph.

Specifically, the step of "reconstructing the cells" includes extending edges and connecting vertices into lines. The step of "extending the edges" is based on the morphological image, and includes outwards extending outermost edges of four sides of the morphological image by a width of at least one pixel to form an extended area, in which pixel values of all the pixels are set to 1 to acquire an extended image. The step of "connecting the vertices into lines" takes the extended image as an object and includes: traversing the extended image sequentially from left to right and from top to bottom; when a pixel having a pixel value equal to 0 is encountered, searching vertices of the same cell using the Moore neighborhood tracking algorithm and recording the vertices together with their order of connection under the name of the cell, deleting repeated records based on a principle that at most six vertices are retained for each cell, and drawing a complete cell by connecting the vertices into a line based on the retained records; subsequently, setting pixel values of all pixels in the cell to 1; finding a next pixel having a pixel value equal to 0 based on this. The above-mentioned procedures are repeated, and the cell reconstruction graph is completed when the traversing is completed.

Embodiment 2

Figure 4:
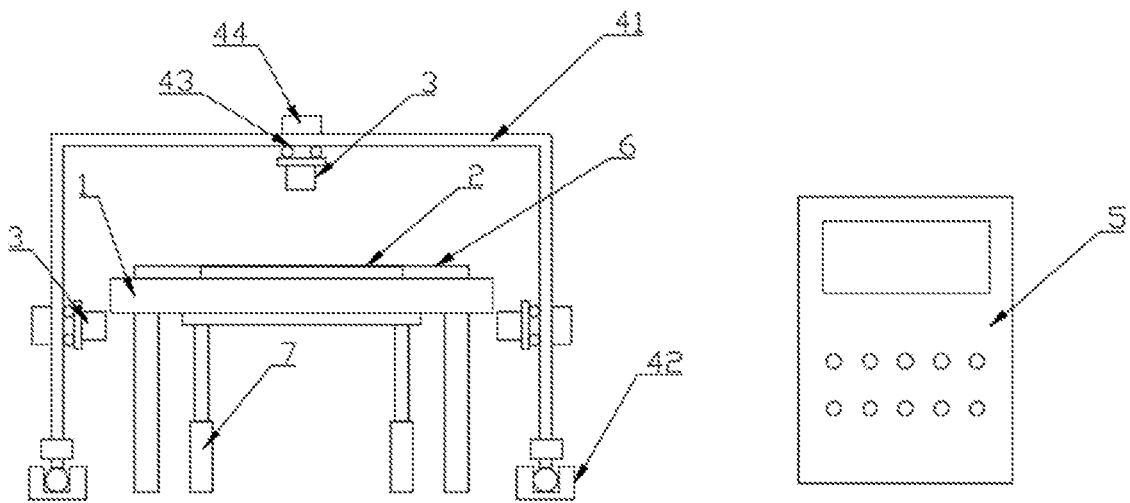
FIG. 4 is a schematic top view of a structure of a system for detecting and evaluating a geometric form of a honeycomb product according to Embodiment 3 of the present invention.
Figure 5:
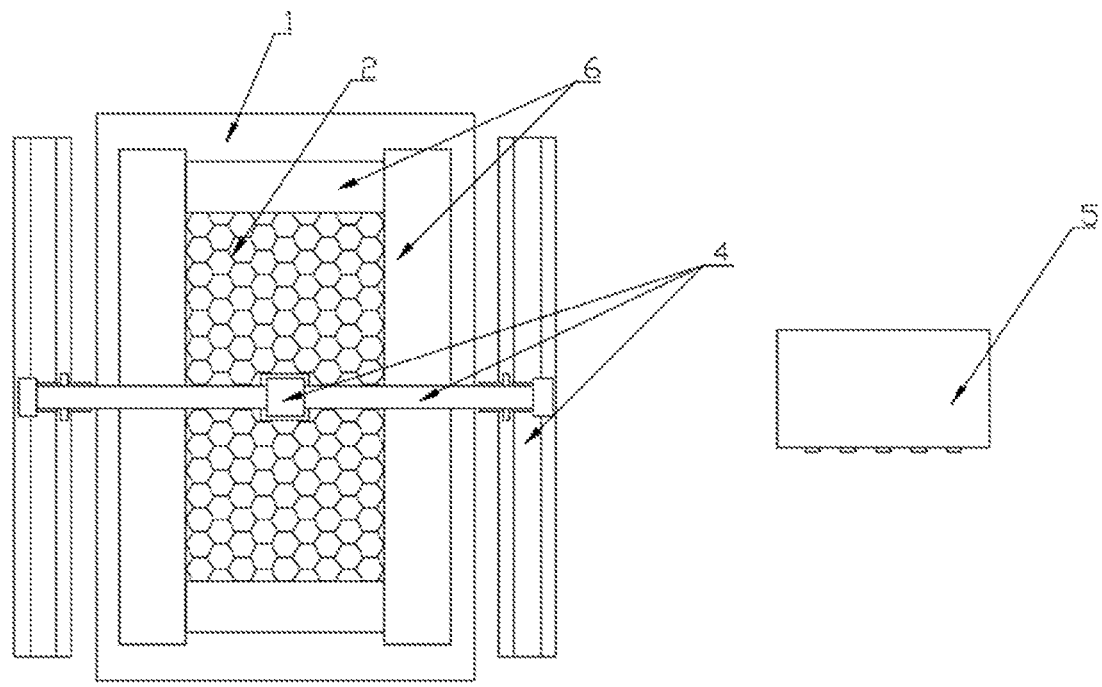
FIG. 5 is a schematic diagram of a testing structure of the system for detecting and evaluating the geometric form of the honeycomb product according to Embodiment 3 of the present invention.

FIG. 4 is a schematic top view of a structure of a system for detecting and evaluating a geometric form of a honeycomb product according to Embodiment 2 of the present invention, and FIG. 5 is a schematic diagram of a testing structure of the system for detecting and evaluating the geometric form of the honeycomb product according to Embodiment 2 of the present invention.

As shown in FIG. 4 and FIG. 5, this embodiment provides the system for detecting and evaluating the geometric form of the honeycomb product. The system includes:

a placement stage 1 configured to support a honeycomb product 2;

cameras 3 disposed above a top of and on a side of the honeycomb product 2 and configured to shoot the honeycomb product 2 to acquire an original top-surface image and an original side-surface image of the honeycomb product 2;

a camera moving device 4 configured to move the cameras 3 above the top of and at the side of the honeycomb product 2 so that the cameras may acquire a complete original top-surface image and a complete original side-surface image;

an analyzing and evaluating module 5 configured to: acquire a top-surface image and a side-surface image by acquiring and performing noise-reduction filtering, binarization and morphological filtering on the complete original top-surface image and the complete original side-surface image; acquire vertex coordinates by extracting vertices from the top-surface image; acquire serial numbers of six vertices of each cell by reconstructing the cells of the top-surface image; compute deviation angles of six interior angles of each cell based on the serial numbers and vertex coordinates of the six vertices of each cell; extract a top-surface side boundary and a side-surface side boundary of the honeycomb product 2 from the preprocessed top-surface and side-surface images; compute a maximum top-surface deflection and a maximum side-surface deflection of the honeycomb product 2 based on the top-surface side boundary and the side-surface side boundary; judge whether the honeycomb product 2 is qualified based on the deviation angles, the maximum top-surface deflection and the maximum side-surface deflection.

By judging whether the geometric form of the honeycomb product is qualified through the acquisition of the top-surface and side-surface images of the honeycomb product, the present invention accurately judges whether the geometric form of the honeycomb product 2 is qualified by simply processing the images in a contactless fashion.

The analyzing and evaluating module 5 in this embodiment is further configured to implement all the content of Embodiment 1, the details of which will not be repeated here.

In an alternative implementation of this embodiment, the camera moving device 4 includes: a walking gantry 41, to which the cameras 3 are connected; sliding rails 42 disposed along a length direction of the honeycomb product 2, where the walking gantry 41 is disposed on and moves along the sliding rails 42.

In an alternative implementation of this embodiment, the camera moving device 4 further includes: a camera 3 moving component. The camera moving component is slidably connected with the walking gantry 41, and the cameras 3 are disposed on the camera moving component, and slides on the walking gantry 41 through the camera moving component.

In an alternative implementation of this embodiment, the camera moving component includes: rollers 43 and a moving block 44. The moving block 44 is sleeved on the walking gantry 41, and is connected to the walking gantry 41 through the rollers 43, so that the moving block 44 slides on the walking gantry 41. The cameras 3 are detachably connected to the moving block 44, and acquire the complete original top-surface and original side-surface images of the honeycomb product 2 by the movement of the moving block 44. Optionally, the system for detecting and evaluating the geometric form of the honeycomb product further includes a clamp 6 configured to fix a position of the honeycomb product 2 on the placement stage 1 to facilitate the shooting of the cameras 3.

In an alternative implementation of this embodiment, the clamp 6 is composed of four flat plates and a driving device. The flat plates are configured to be moved closer to the honeycomb product 2 under the action of the driving device, and is locked after abutting the honeycomb product 2 to be detected, so at to fix the honeycomb product 2 to be detected.

In an alternative implementation of this embodiment, a side of the clamp 6 close to the honeycomb product 2 is painted bright yellow, so that a boundary of the honeycomb product 2 can be clearly defined in an image to assist image processing.

In an alternative implementation of this embodiment, the system for detecting and evaluating the geometric form of the honeycomb product 2 further includes a lifting device 7 of the placement stage 1. The lifting device 7 is configured to adjust the height of the honeycomb product 2 to maintain a proper distance between the honeycomb product 2 and the camera 3 disposed above the top of the honeycomb product 2, thereby facilitating the shooting by the camera 3. Further optionally, an upper plane of the honeycomb product 2 and an upper plane of the clamp 6 may be kept at the same height by the lifting device 7, and a vertical distance between the clamp 6 and the camera 3 is unchanged, so that a fixed distance is further maintained between the upper plane of the honeycomb product 2 and the camera 3, thereby facilitating the shooting by the camera 3. Specifically, the lifting device 7 includes a hydraulic rod.

In an alternative implementation of this embodiment, the system for detecting and evaluating the geometric form of the honeycomb product 2 further includes a display module. The display module is connected to the analyzing and evaluating module 5 and is configured to display whether the geometric form of the honeycomb product 2 is judged as qualified.

In an alternative implementation of this embodiment, the display module includes a display light, which turns on green if the honeycomb product 2 is judged as qualified and turns on red if it is judged as disqualified.

In an alternative implementation of this embodiment, the system for detecting and evaluating the geometric form of the honeycomb product 2 further includes a calibration module, where a calibration board is a display board having an electronic ink screen, and may display a standard honeycomb with adjustable side length and wall thickness. The outside of the screen displays a color contrasting with that of the honeycomb. After the calibration board is placed on the placement stage 16 and positioned with the clamp 6, the cameras 3 are adjusted to an appropriate position to acquire a photo of the calibration board, and transmit the photo to the analyzing and evaluating module 5 for calibration, thereby checking the detection accuracy of the system.

It should be understood that the specific embodiments above of the present invention are merely for the purposes of exemplarily illustrating or explaining the principle of the present invention, but are not intended to limit the present invention. Therefore, any modifications, equivalent substitutions, improvements and the like made without departing from the spirit and scope of the present invention shall be construed as falling within the protection scope of the present invention. In addition, the claims following the present invention are intended to encompass all the variations and amendments falling within the scope and boundaries or any forms equivalent thereto of the claims.

What is claimed is:

1. A method for evaluating a geometric form of a honeycomb product, comprising steps of:
    acquiring a top-surface image and a side-surface image of the honeycomb product;
    acquiring vertex coordinates by extracting vertices from the top-surface image;
    acquiring serial numbers of six vertices of each cell by reconstructing the cells of the top-surface image;
    computing deviation angles of six interior angles of each cell based on the serial numbers and vertex coordinates of the six vertices of each cell;
    extracting a top-surface side boundary and a side-surface side boundary of the honeycomb product from the top-surface image and the side-surface image;
    computing a maximum top-surface deflection and a maximum side-surface deflection of the honeycomb product based on the top-surface side boundary and the side-surface side boundary;
    judging whether the honeycomb product is qualified based on the deviation angles, the maximum top-surface deflection and the maximum side-surface deflection;
    wherein the step of judging whether the honeycomb product is qualified based on the deviation angles, the maximum top-surface deflection and the maximum side-surface deflection comprises a step of:
    judging the honeycomb product as qualified if geometric regularity of the honeycomb product judged based on the deviation angles, the maximum top-surface deflection and the maximum side-surface deflection reaches a preset standard;
    wherein the geometric regularity comprises: top-surface cell regularity, side-surface flatness, and top-surface flatness, and
    the step of judging the honeycomb product as qualified if the geometric regularity of the honeycomb product judged based on the deviation angles, the maximum top-surface deflection and the maximum side-surface deflection reaches the preset standard, comprises steps of:
    judging the top-surface cell regularity based on the deviation angles,
    judging the side-surface flatness based on the maximum top-surface deflection,
    judging the top-surface flatness based on the maximum side-surface deflection, and
    judging the honeycomb product as qualified if the top-surface cell regularity, the side-surface flatness and the top-surface flatness all reach preset standards.

2. The method for evaluating the geometric form of the honeycomb product according to claim 1, wherein judgment indexes for the top-surface cell regularity comprise one or more of a maximum deviation angle, an average deviation angle, a maximum value among average cell deviation angles, a standard deviation of deviation angle and a standard deviation of average cell deviation angle;
    it is judged that the top-surface cell regularity reaches the preset standard if one or more of the maximum deviation angle, the average deviation angle, the maximum value among average cell deviation angles, the standard deviation of deviation angle and the standard deviation of average cell deviation angle is/are less than a preset threshold(s).

3. A system for detecting and evaluating a geometric form of a honeycomb product, configured to implement the method for evaluating the geometric form of the honeycomb product according to claim 2, and comprising:
    a placement stage (1) configured to support a honeycomb product (2);
    cameras (3) disposed above a top of and on a side of the honeycomb product (2) and configured to acquire an original top-surface image and an original side-surface image of the honeycomb product (2) by shooting the honeycomb product (2);
    a camera moving device (4) configured to move the cameras (3) above the top of and at the side of the honeycomb product (2) so that the cameras acquire a complete original top-surface image and a complete original side-surface image;
    an analyzing and evaluating module (5) configured to: acquire a top-surface image and a side-surface image by acquiring and performing noise-reduction filtering, binarization and morphological filtering on the complete original top-surface image and the complete original side-surface image; acquire vertex coordinates by extracting vertices from the top-surface image; acquire serial numbers of six vertices of each cell by reconstructing the cells of the top-surface image; compute deviation angles of six interior angles of each cell based on the serial numbers and vertex coordinates of the six vertices of each cell; extract a top-surface side boundary and a side-surface side boundary of the honeycomb product (2) from the preprocessed top-surface and side-surface images; compute a maximum top-surface deflection and a maximum side-surface deflection of the honeycomb product (2) based on the top-surface side boundary and the side-surface side boundary; judge whether the honeycomb product (2) is qualified based on the deviation angles, the maximum top-surface deflection and the maximum side-surface deflection.

4. The method for evaluating the geometric form of the honeycomb product according to claim 1, wherein judgment indexes for the top-surface cell regularity comprise one or more of a maximum deviation angle, an average deviation angle, a maximum value among average cell deviation angles, a standard deviation of deviation angle and a standard deviation of average cell deviation angle;
   it is judged that the top-surface cell regularity reaches the preset standard if a proportion(s), higher than a preset threshold(s), of one or more of the maximum deviation angle, the average deviation angle, the maximum value among average cell deviation angles, the standard deviation of deviation angle and the standard deviation of average cell deviation angle is/are less than a preset proportion(s).

5. A system for detecting and evaluating a geometric form of a honeycomb product, configured to implement the method for evaluating the geometric form of the honeycomb product according to claim 4, and comprising:
   a placement stage (1) configured to support a honeycomb product (2);
   cameras (3) disposed above a top of and on a side of the honeycomb product (2) and configured to acquire an original top-surface image and an original side-surface image of the honeycomb product (2) by shooting the honeycomb product (2);
   a camera moving device (4) configured to move the cameras (3) above the top of and at the side of the honeycomb product (2) so that the cameras acquire a complete original top-surface image and a complete original side-surface image;
   an analyzing and evaluating module (5) configured to: acquire a top-surface image and a side-surface image by acquiring and performing noise-reduction filtering, binarization and morphological filtering on the complete original top-surface image and the complete original side-surface image; acquire vertex coordinates by extracting vertices from the top-surface image; acquire serial numbers of six vertices of each cell by reconstructing the cells of the top-surface image; compute deviation angles of six interior angles of each cell based on the serial numbers and vertex coordinates of the six vertices of each cell; extract a top-surface side boundary and a side-surface side boundary of the honeycomb product (2) from the preprocessed top-surface and side-surface images; compute a maximum top-surface deflection and a maximum side-surface deflection of the honeycomb product (2) based on the top-surface side boundary and the side-surface side boundary; judge whether the honeycomb product (2) is qualified based on the deviation angles, the maximum top-surface deflection and the maximum side-surface deflection.

6. The method for evaluating the geometric form of the honeycomb product according to claim 1, wherein judgment indexes for the top-surface cell regularity comprise an average cell deviation angle;
   it is judged that the top-surface cell regularity reaches the preset standard if the average cell deviation angle is successively not greater than percentages of cells A1, A2, A3, A4, and A5 in terms of overall cells, and is successively less than corresponding thresholds B1, B2, B3, B4, and B5.

7. A system for detecting and evaluating a geometric form of a honeycomb product, configured to implement the method for evaluating the geometric form of the honeycomb product according to claim 6, and comprising:
   a placement stage (1) configured to support a honeycomb product (2);
   cameras (3) disposed above a top of and on a side of the honeycomb product (2) and configured to acquire an original top-surface image and an original side-surface image of the honeycomb product (2) by shooting the honeycomb product (2);
   a camera moving device (4) configured to move the cameras (3) above the top of and at the side of the honeycomb product (2) so that the cameras acquire a complete original top-surface image and a complete original side-surface image;
   an analyzing and evaluating module (5) configured to: acquire a top-surface image and a side-surface image by acquiring and performing noise-reduction filtering, binarization and morphological filtering on the complete original top-surface image and the complete original side-surface image; acquire vertex coordinates by extracting vertices from the top-surface image; acquire serial numbers of six vertices of each cell by reconstructing the cells of the top-surface image; compute deviation angles of six interior angles of each cell based on the serial numbers and vertex coordinates of the six vertices of each cell; extract a top-surface side boundary and a side-surface side boundary of the honeycomb product (2) from the preprocessed top-surface and side-surface images; compute a maximum top-surface deflection and a maximum side-surface deflection of the honeycomb product (2) based on the top-surface side boundary and the side-surface side boundary; judge whether the honeycomb product (2) is qualified based on the deviation angles, the maximum top-surface deflection and the maximum side-surface deflection.

8. The method for evaluating the geometric form of the honeycomb product according to claim 1, wherein a method for extracting the vertices comprises steps of:
   acquiring a skeleton diagram of the honeycomb product;
   acquiring a sequence of boundary pixels of a cell by extracting boundary pixels belonging to the same cell from the skeleton image;
   acquiring a sequence of included angles corresponding to the boundary pixels by acquiring the included angles corresponding to the boundary pixels respectively, wherein each of the included angles is an included angle between connecting lines of one of the boundary pixels with two pixels, in the sequence of the boundary pixels, that are separated from the one of the boundary pixels by a first preset number of pixels respectively, at both sides of the one of the boundary pixels;
   performing non-minimum suppression on the sequence of included angles by using a window having a size of a second preset value, wherein included angles other than an included angle with a minimum value in the window are set as first preset included angles;
   determining, when the non-minimum suppression on the sequence of included angles is completed, the boundary pixels corresponding to included angles smaller than a second preset included angle among all the minimum values, as the vertices.

9. A system for detecting and evaluating a geometric form of a honeycomb product, configured to implement the method for evaluating the geometric form of the honeycomb product according to claim 7, and comprising:
   a placement stage (1) configured to support a honeycomb product (2);
   cameras (3) disposed above a top of and on a side of the honeycomb product (2) and configured to acquire an original top-surface image and an original side-surface image of the honeycomb product (2) by shooting the honeycomb product (2);

a camera moving device (4) configured to move the cameras (3) above the top of and at the side of the honeycomb product (2) so that the cameras acquire a complete original top-surface image and a complete original side-surface image;

an analyzing and evaluating module (5) configured to: acquire a top-surface image and a side-surface image by acquiring and performing noise-reduction filtering, binarization and morphological filtering on the complete original top-surface image and the complete original side-surface image; acquire vertex coordinates by extracting vertices from the top-surface image; acquire serial numbers of six vertices of each cell by reconstructing the cells of the top-surface image; compute deviation angles of six interior angles of each cell based on the serial numbers and vertex coordinates of the six vertices of each cell; extract a top-surface side boundary and a side-surface side boundary of the honeycomb product (2) from the preprocessed top-surface and side-surface images; compute a maximum top-surface deflection and a maximum side-surface deflection of the honeycomb product (2) based on the top-surface side boundary and the side-surface side boundary; judge whether the honeycomb product (2) is qualified based on the deviation angles, the maximum topsurface deflection and the maximum side-surface deflection.

10. The method for evaluating the geometric form of the honeycomb product according to claim 1, wherein a method for extracting the vertices comprises steps of:
acquiring a skeleton diagram of a vertex image;
searching eight neighborhoods of each pixel on the skeleton diagram for a round according to a preset sequence, wherein a pixel is determined as a vertex if this pixel's value has changed six times.

11. A system for detecting and evaluating a geometric form of a honeycomb product, configured to implement the method for evaluating the geometric form of the honeycomb product according to claim 10, and comprising: a placement stage (1) configured to support a honeycomb product (2); cameras (3) disposed above a top of and on a side of the honeycomb product (2) and configured to acquire an original top-surface image and an original side-surface image of the honeycomb product (2) by shooting the honeycomb product (2); a camera moving device (4) configured to move the cameras (3) above the top of and at the side of the honeycomb product (2) so that the cameras acquire a complete original topsurface image and a complete original side-surface image; an analyzing and evaluating module (5) configured to: acquire a top-surface image and a side-surface image by acquiring and performing noise-reduction filtering, binarization and morphological filtering on the complete original top-surface image and the complete original side-surface image; acquire vertex coordinates by extracting vertices from the topsurface image; acquire serial numbers of six vertices of each cell by reconstructing the cells of the top-surface image; compute deviation angles of six interior angles of each cell based on the serial numbers and vertex coordinates of the six vertices of each cell; extract a topsurface side boundary and a side-surface side boundary of the honeycomb product (2) from the preprocessed topsurface and side-surface images; compute a maximum topsurface deflection and a maximum side-surface deflection of the honeycomb product (2) based on the top-surface side boundary and the side-surface side boundary; judge whether the honeycomb product (2) is qualified based on the deviation angles, the maximum topsurface deflection and the maximum side-surface deflection.

12. The method for evaluating the geometric form of the honeycomb product according to claim 1, wherein a method for extracting the vertices comprises:

S1: acquiring a square window with a preset side length L, and setting a square window with a side length increasing successively from 3 pixels, wherein after the square window traverses a vertex image, a minimum value of a number of pixels having pixel values of 0 in the square window is non-zero for the first time;

S2: traversing each pixel having a pixel value of 1 in the vertex image with the square window, and then assigning a sum of counts of pixels having the pixel values of 1 in each square window to a pixel at a center point of the square window;

S3: establishing a square area with an initial side length E=L with the maximum assigned pixel as a center, computing an absolute value of a difference between an assigned value of each pixel on the four boundaries of the square area and the assigned value of the center point of the square area, and recording a minimum absolute value Z of the difference and coordinates of a boundary pixel corresponding thereto;

S4: establishing a new square area with E=E+2 pixels, repeating S3 until the minimum absolute value of the difference has an obvious trend of increasing reversely to acquire at this time coordinates of a boundary pixel with the minimum absolute value Z of the difference and coordinates of a corresponding center point of a square area, and acquiring a side length A of a honeycomb cell by solving values of the coordinates of the boundary pixel with the value Z and solving values of the coordinates of the corresponding center point of the square area;

S5: determining a pixel having a maximum assigned value as a vertex, establishing a square annihilation window, with a side length A of the honeycomb cell as a side length, by taking the vertex as a center, zero-clearing the assigned values on all pixels having pixel values of 1 in the annihilation window, based on which a pixel with a maximum assigned value among the remaining assigned values is found, determined as a vertex and recorded, and repeating the procedures of the annihilation window until the assigned value on each pixel having the pixel value of 1 is less than a given threshold, and extracting all the vertices.

13. A system for detecting and evaluating a geometric form of a honeycomb product, configured to implement the method for evaluating the geometric form of the honeycomb product according to claim 12, and comprising:

a placement stage (1) configured to support a honeycomb product (2);

cameras (3) disposed above a top of and on a side of the honeycomb product (2) and configured to acquire an original top-surface image and an original side-surface image of the honeycomb product (2) by shooting the honeycomb product (2);

a camera moving device (4) configured to move the cameras (3) above the top of and at the side of the honeycomb product (2) so that the cameras acquire a complete original top-surface image and a complete original side-surface image;

an analyzing and evaluating module (5) configured to: acquire a top-surface image and a side-surface image by acquiring and performing noise-reduction filtering, binarization and morphological filtering on the complete original top-surface image and the complete original side-surface image; acquire vertex coordinates by extracting vertices from the top-surface image; acquire serial numbers of six vertices of each cell by reconstructing the cells of the top-surface image; compute deviation angles of six interior angles of each cell based on the serial numbers and vertex coordinates of the six vertices of each cell; extract a top-surface side boundary and a side-surface side boundary of the honeycomb product (2) from the preprocessed top-surface and side-surface images; compute a maximum top-surface deflection and a maximum side-surface deflection of the honeycomb product (2) based on the top-surface side boundary and the side-surface side boundary; judge whether the honeycomb product (2) is qualified based on the deviation angles, the maximum top-surface deflection and the maximum side-surface deflection.

14. The method for evaluating the geometric form of the honeycomb product according to claim 1, wherein a method for reconstructing cells comprises steps of:
   tracking a boundary of each cell by using a Moore neighborhood tracking algorithm;
   establishing a window having a preset size with each tracked boundary point as a center, recording, if a vertex is present in the window, a number of the vertex and storing the number under the name of the cell, ranking encountered vertices of the cell based on a sequential order of the encountered vertices, and after the tracking, connecting the vertices of the respective cells into lines in sequence to acquire a cell reconstruction graph.

15. A system for detecting and evaluating a geometric form of a honeycomb product, configured to implement the method for evaluating the geometric form of the honeycomb product according to claim 1, and comprising:
   a placement stage (1) configured to support a honeycomb product (2);
   cameras (3) disposed above a top of and on a side of the honeycomb product (2) and configured to acquire an original top-surface image and an original side-surface image of the honeycomb product (2) by shooting the honeycomb product (2);
   a camera moving device (4) configured to move the cameras (3) above the top of and at the side of the honeycomb product (2) so that the cameras acquire a complete original top-surface image and a complete original side-surface image;
   an analyzing and evaluating module (5) configured to: acquire a top-surface image and a side-surface image by acquiring and performing noise-reduction filtering, binarization and morphological filtering on the complete original top-surface image and the complete original side-surface image; acquire vertex coordinates by extracting vertices from the top-surface image; acquire serial numbers of six vertices of each cell by reconstructing the cells of the top-surface image; compute deviation angles of six interior angles of each cell based on the serial numbers and vertex coordinates of the six vertices of each cell; extract a top-surface side boundary and a side-surface side boundary of the honeycomb product (2) from the preprocessed top-surface and side-surface images; compute a maximum top-surface deflection and a maximum side-surface deflection of the honeycomb product (2) based on the top-surface side boundary and the side-surface side boundary; judge whether the honeycomb product (2) is qualified based on the deviation angles, the maximum top-surface deflection and the maximum side-surface deflection.

16. The system for detecting and evaluating the geometric form of the honeycomb product according to claim 15, wherein the camera moving device (4) comprises:
   a walking gantry (41), to which the cameras (3) are connected;
   sliding rails (42) disposed along a length direction of the honeycomb product, wherein the walking gantry (41) is disposed on and moves along the sliding rails (42).

* * * * *